US009702508B2

(12) United States Patent
Cao et al.

(10) Patent No.: US 9,702,508 B2
(45) Date of Patent: Jul. 11, 2017

(54) METERING AND WELL SELECTION VALVE GROUP

(71) Applicant: Jiangsheng Cao, Binzhou, Shandong (CN)

(72) Inventors: Jiangsheng Cao, Shandong (CN); Yi Cao, Shandong (CN)

(73) Assignee: Jiangsheng Cao, Shandong (CN)

( * ) Notice: Subject to any disclaimer, the term of this patent is extended or adjusted under 35 U.S.C. 154(b) by 244 days.

(21) Appl. No.: 14/372,616

(22) PCT Filed: Jan. 6, 2014

(86) PCT No.: PCT/CN2014/070133
§ 371 (c)(1),
(2) Date: Jul. 16, 2014

(87) PCT Pub. No.: WO2014/198125
PCT Pub. Date: Dec. 18, 2014

(65) Prior Publication Data
US 2015/0226380 A1 Aug. 13, 2015

(30) Foreign Application Priority Data
Jun. 15, 2013 (CN) ..................... 2013 2 0341503 U

(51) Int. Cl.
*F16D 3/18* (2006.01)
*F17D 3/18* (2006.01)

(52) U.S. Cl.
CPC ......... *F17D 3/18* (2013.01); *Y10T 137/86734* (2015.04); *Y10T 137/87249* (2015.04)

(58) Field of Classification Search
CPC ............... F17D 3/18; Y10T 137/86734; Y10T 137/87249; Y10T 137/7876; Y10T 137/7877; Y10T 137/7878
(Continued)

(56) References Cited

U.S. PATENT DOCUMENTS 359,948 A * 3/1887 Wilson ................. G05D 16/103 137/505
1,491,683 A * 4/1924 Donnell .................. G01L 17/00 137/524
(Continued)

FOREIGN PATENT DOCUMENTS

GB 1018845 * 10/1963

OTHER PUBLICATIONS

Machine Translation of DE3324308, Jan. 17, 1985, All pages.*
(Continued)

*Primary Examiner* — Craig Schneider
*Assistant Examiner* — Frederick D Soski
(74) *Attorney, Agent, or Firm* — Oliff PLC

(57) ABSTRACT

A metering and well selection valve group, comprising a rotary type metering distributor with multiple shells; after entering the shells, an elbow extends from one side of shells; the part of elbow positioned in the shells is provided with filtering holes. Filtered fluid outlets are provided on the shells. Multiple check and stop dual purpose angle valves are corresponding to the quantity of shells, each one has a valve with an inlet pipe, a valve stem, a valve base, a valve element is provided on the inside of valve base, a handwheel is mounted on the outer end of valve stem. A first spring is mounted between the spring stop and the valve element. The outlet pipe of filtered fluid is communicated with the outlet of filtered fluid on the case body on the rotary metering distributor. Through the first valve, the extended part of elbow is communicated with the blocking removal fluid outlet chamber on the case body on the rotary metering distributor. In said metering valve group, the control valve is a check and stop dual-purpose angle valve which simultaneously has two functions.

3 Claims, 3 Drawing Sheets

(58) Field of Classification Search
USPC ......... 166/267, 105.4, 157, 158, 332.1, 236, 166/233; 251/157–204; 137/511–543.23
See application file for complete search history.

(56) References Cited

U.S. PATENT DOCUMENTS

| | | | | | |
|---|---|---|---|---|---|
| 1,865,560 | A * | 7/1932 | Duffield | F16K 17/10 | 137/522 |
| 2,341,018 | A * | 2/1944 | Clapp | F01L 3/00 | 137/244 |
| 2,375,810 | A * | 5/1945 | Nelson | F16K 17/00 | 137/458 |
| 2,908,288 | A * | 10/1959 | Carr | F16K 17/06 | 137/524 |
| 3,189,040 | A * | 6/1965 | Johnson | F16K 17/044 | 137/469 |
| 3,384,101 | A * | 5/1968 | Melzer | F16K 17/003 | 137/314 |
| 3,589,397 | A * | 6/1971 | Wagner | F16K 1/305 | 137/384.2 |
| 3,651,829 | A * | 3/1972 | Frantz | F01P 11/20 | 137/522 |
| 3,705,626 | A * | 12/1972 | Glenn, Jr. | E21B 43/34 | 166/250.15 |
| 3,729,020 | A * | 4/1973 | Koci | F01P 11/20 | 137/522 |
| 3,733,048 | A * | 5/1973 | Hiszpanski | F16K 1/36 | 137/529 |
| 4,543,987 | A * | 10/1985 | Ekeleme, Jr. | F16K 17/0413 | 137/522 |
| 4,598,545 | A * | 7/1986 | Harada | F16D 25/14 | 137/625.3 |
| 4,756,330 | A * | 7/1988 | Tischer | F15B 13/022 | 137/101 |
| 5,516,079 | A * | 5/1996 | Baumann | F16K 1/34 | 137/454.5 |
| 7,048,061 | B2 * | 5/2006 | Bode | E21B 34/14 | 166/205 |
| 7,258,166 | B2 * | 8/2007 | Russell | E21B 43/082 | 166/205 |
| 8,297,360 | B2 * | 10/2012 | Donald | E21B 33/035 | 166/364 |
| 2003/0173075 | A1 * | 9/2003 | Morvant | E21B 43/088 | 166/230 |
| 2005/0034869 | A1 * | 2/2005 | Appleford | E21B 43/40 | 166/357 |
| 2006/0213661 | A1 * | 9/2006 | Jackson | E21B 43/124 | 166/267 |
| 2012/0048536 | A1 * | 3/2012 | Holderman | B23P 11/025 | 166/228 |
| 2012/0152528 | A1 * | 6/2012 | Greci | E21B 43/088 | 166/227 |

OTHER PUBLICATIONS

Machine Translation of CN102878434A, Jan. 16, 2013, All pages.*
Machine Translation of CN2279484, Aug. 24, 1996, All Pages.*
Machine Translation of CN101158445, Apr. 9, 2008, All Pages.*

* cited by examiner

METERING AND WELL SELECTION VALVE GROUP

FIELD OF THE INVENTION

The present utility model relates to an improved oil gas measurement and gathering device, in particular to an improved measurement and well selection valve group.

BACKGROUND

At present, the oil gas measurement and gathering device is composed of a separate filter, a check valve, a stop valve (or gate valve) as well as a duplex delivery valve consisting of pipelines, featuring complicated structure and huge volume. To measure each well, it is required to manually operate the corresponding multiple valves, leading to great labor intensity and low working efficiency, since only 2~3 wells can be measured per day. Furthermore, such oil gas measurement and gathering device is high in manufacturing cost, cumbersome in operation and inaccurate in measurement. The adopted filter requires removal of blocking after being used for a period of time. However, due to its unreasonable structure, the removal of blocking can be completed only after it has been disassembled. Since long time is needed for disassembly, the normal use of this filter is affected, and environmental pollution will be caused. Therefore, the use of such metering valve group is unsatisfactory.

SUMMARY OF THE INVENTION

It is the technical objective of the present utility model to provide a new type of metering and well selection valve group, so as to improve its use.

The present utility model is realized in the following measure. A new type of metering and well selection valve group, comprising a rotary type metering distributor with multiple shells; an elbow is inside the shells and extends out from one side of the shells; the part of the elbow positioned in the shells is provided with filtering holes. Filtered fluid outlets are provided on the shells. The metering and well selection valve group also comprises multiple check and stop dual purpose angle valves, which correspond to the quantity of shells. A valve casing is provided on each check and stop dual purpose angle valve. An inlet pipe is provided at one end of the valve casing, a valve stem is mounted at another end. One side of the valve casing is communicated with an outlet pipe, a valve base is provided in the valve casing, a valve element is provided on the inside of valve base, the valve element is mounted in together with the cover body, and a handwheel is mounted on the outer end of valve stem. After the inner end has passed through the cover body, a spring stop is fixed. A first spring is mounted between the spring stop and the valve element. The outlet pipe of filtered fluid is communicated with the inlet of the filtered fluid on the case body on the rotary metering distributor. Through the first valve, the extended part of the elbow is communicated with the blocking removal fluid outlet chamber on the case body on the rotary metering distributor.

On the rotary metering distributor, a motor is mounted on the outside of the case body; through a communicating pipe, the inner chamber of the rotary chamber body on the motor shaft is communicated with the connecting chamber body; the inner chamber of the rotary chamber body is also communicated with the metering outlet pipe through the metering outlet on the multi-channel distribution seat; and the filtered fluid inlet is communicated with the inner chamber of the connecting chamber body through the fluid inlet channel on the multi-channel distribution seat. A sealing device is provided at a position where the connecting chamber body is close to the multi-channel distribution seat; one end of the second valve is communicated with the front chamber body in the front of the multi-channel distribution seat, the other end of the second valve is communicated with the gathering main pipe. One end of the third valve is communicated with the rear chamber body at the back of the multi-channel distribution seat, and the other end of the third valve body is communicated with the gathering mainpipe. A sealed cylinder body positioned within the connecting chamber body is provided on the sealing device. A second spring is provided between the side wall of the connecting chamber body and the end surface of the sealed cylinder body. An O-ring is provided between the sealed cylinder body and the connecting chamber body.

In the metering valve group designed in said structure, the control valve is a check and stop dual purpose angle valve, which has reasonable structure and simultaneously has two functions (namely check and stop). As a result, the structure of the equipment using valve is effectively simplified, the manufacturing cost is reduced, the operation is simplified and the failure rate is also reduced. The blocking removal operation can be completed without the need for disassembling the filter, so that the operation is simplified, less time is needed, normal production is guaranteed, and no environmental pollution will be caused during removal of blocking. Therefore, this metering valve group has good usage.

DETAILED DESCRIPTION OF PREFERRED EMBODIMENTS

The present utility model is further described in combination with the embodiments provided in the attached drawings.

Figure 1:
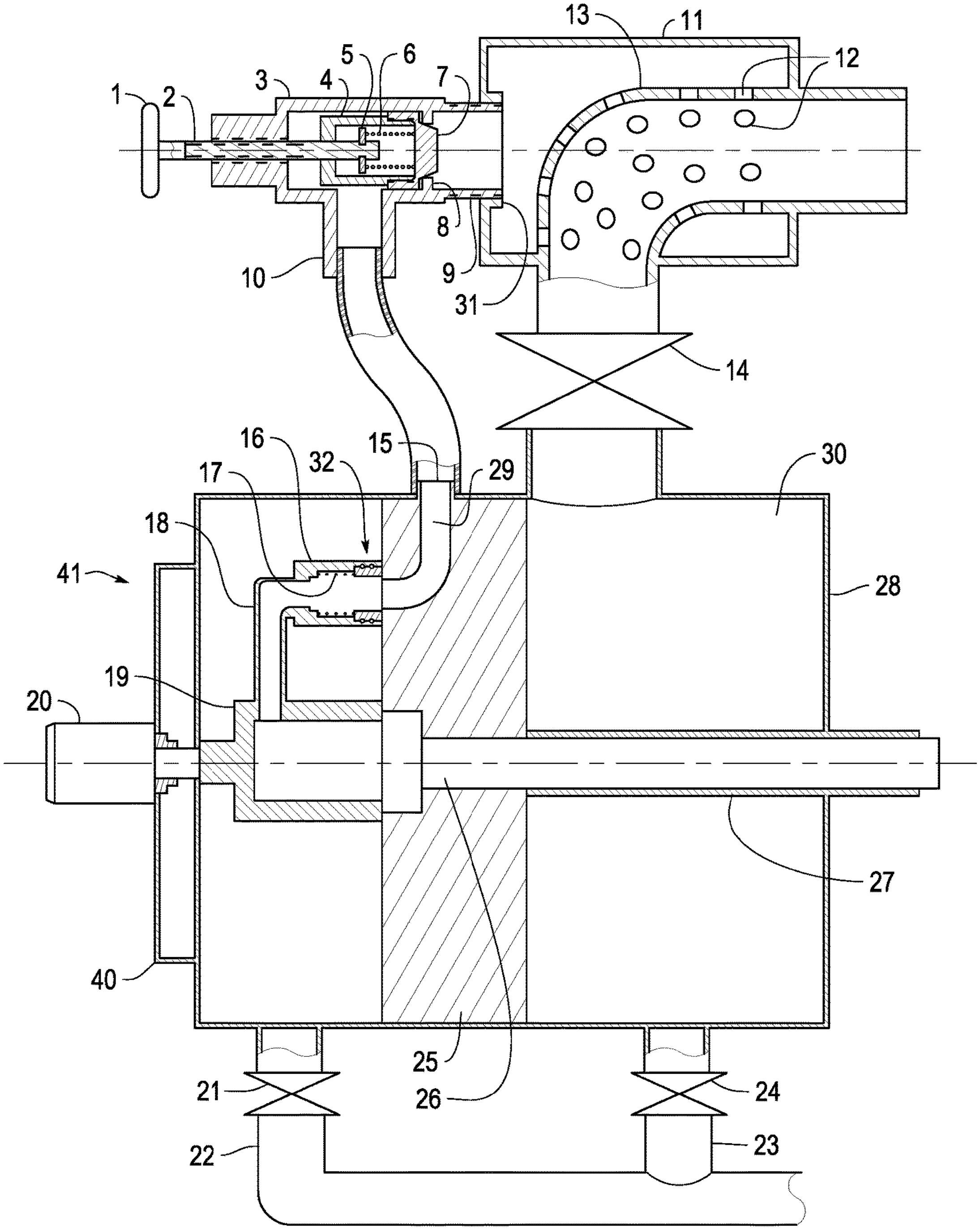
FIG. 1 is the structure diagram of the present utility model.
Figure 2:
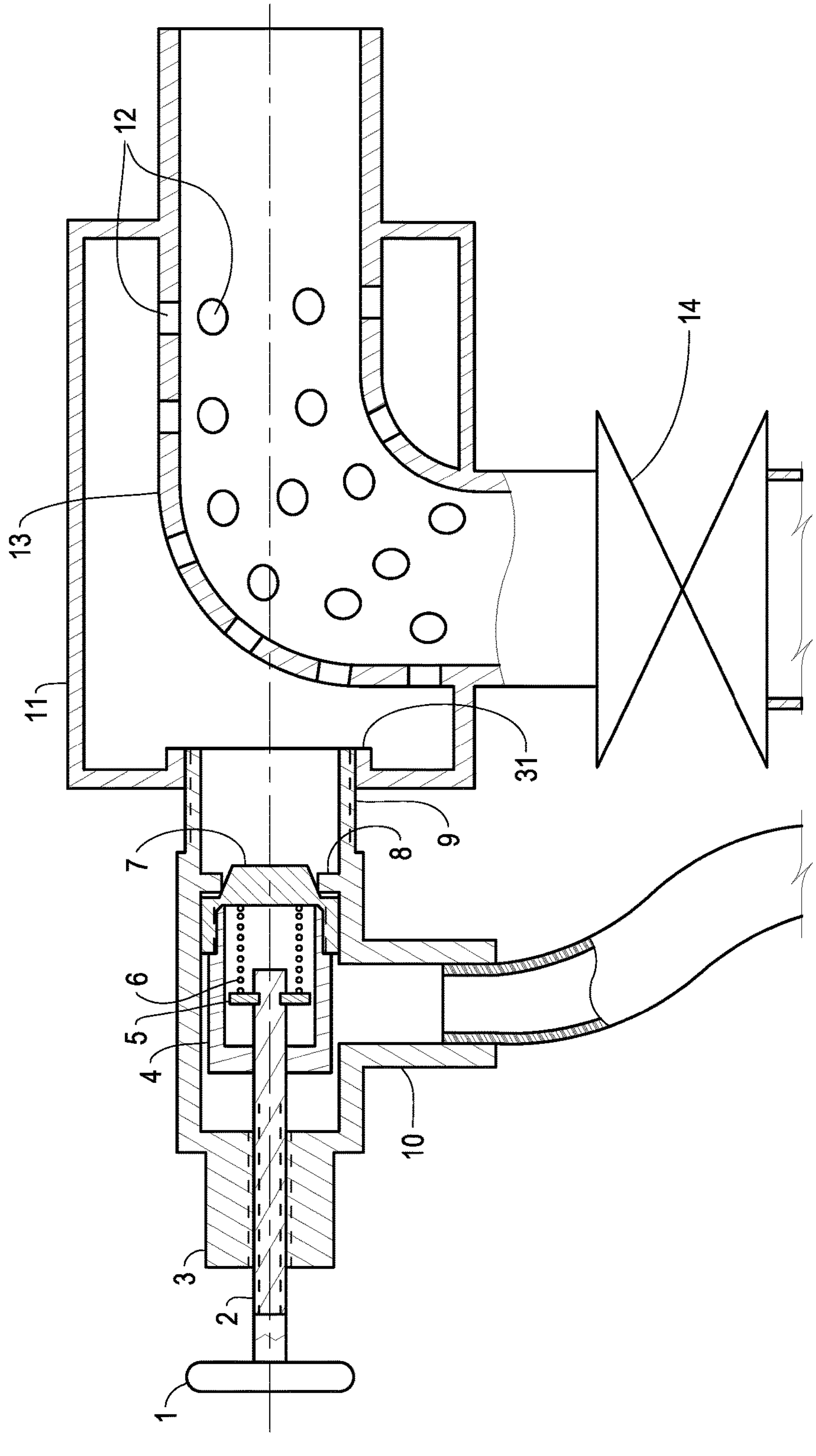
FIG. 2 is the enlarged view of partial structure of the present utility model.
Figure 3:
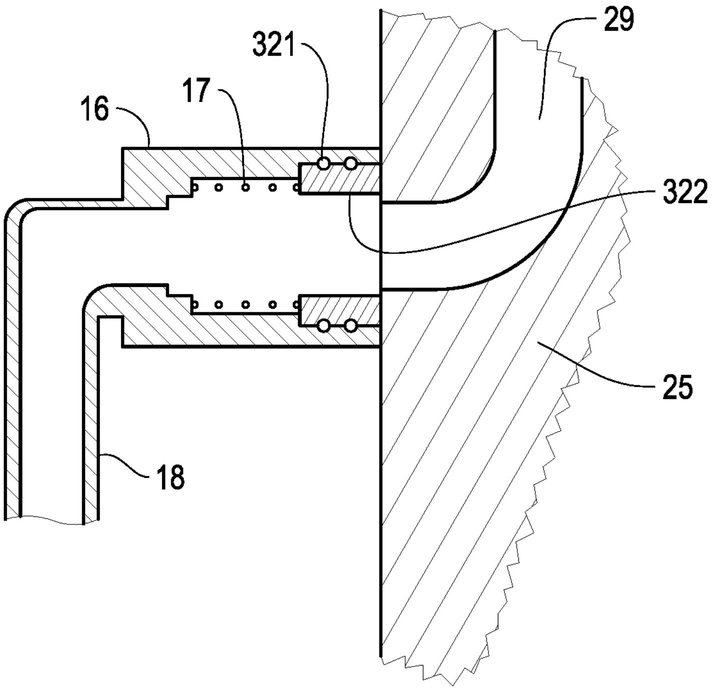
FIG. 3 is the structure diagram of the sealing device in the present utility model.
Figure 4:
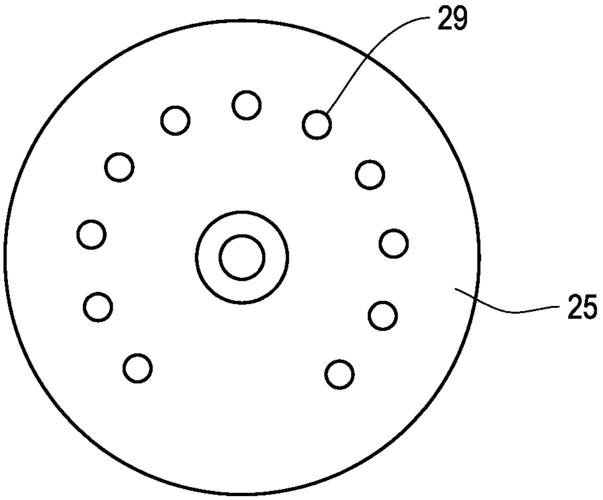
FIG. 4 is the left view of the multi-channel distribution seat in the present utility model.

As shown in FIG. 1, the present utility model provides a new type of metering and well selection valve group, comprising a rotary type metering distributor 40, the rotary metering distributor has multiple shells 11; an elbow 13 is inside the shells and extends out from one side of the shells; the part of elbow positioned in the shells is provided with filtering holes 12. Filtered fluid outlets 31 are provided on the shells. The metering and well selection valve group also comprises multiple check and stop dual purpose angle valves, which are corresponding to the quantity of shells. A valve casing 3 is provided on each check and stop dual purpose angle valve. An inlet pipe 9 is provided at one end of valve casing, a valve stem 2 is mounted at another end, one side of the valve casing is communicated with an outlet pipe 10, a valve base 8 is provided in the valve casing, a valve element 7 is provided on the inside of valve base, the valve element is mounted in together with a cover body 4, a handwheel 1 is mounted on the outer end of the valve stem.

After the inner end has passed through the cover body, a spring stop 5 is fixed. A first spring 6 is mounted between the spring stop and the valve element. The outlet pipe of filtered fluid 10 is communicated with the inlet 15 of filtered fluid on the case body 28 on the rotary metering distributor 40. Through the first valve 14, the extended part of the elbow is communicated with the blocking removal fluid outlet chamber 30 on the case body on the rotary metering distributor.

Being same as the design on the gathering metering device in the prior art, on the rotary metering distributor 40, a motor 20 is mounted on the outside of case body, the inner chamber of the rotary chamber body 19 on the motor shaft is communicated with the connecting chamber body 16 through the communicating pipe 18; the inner chamber of the rotary chamber body is also communicated with the metering outlet pipe 27 through the metering outlet 26 on the multi-channel distribution seat 25, the filtered fluid inlet 15 is communicated with the inner chamber of the connecting chamber body 16 through the fluid inlet channel 29 on the multi-channel distribution seat 25, a sealing device 32 is provided on the position where the connecting chamber body is close to the multi-channel distribution seat; one end of the second valve 21 is communicated with the front chamber body in the front of the multi-channel distribution seat, and the other end of the second valve is communicated with the gathering main pipe 22. One end of the third valve 24 is communicated with the blocking removal fluid outlet chamber 30 at the back of the multi-channel distribution seat, the other end of the third valve is communicated with the gathering main pipe 22. A sealed cylinder body 322 positioned in the connecting chamber body is provided on the sealing device 32. A second spring 17 is provided between the side wall of connecting chamber body and the end surface of sealed cylinder body. An O-ring 321 is provided between the sealed cylinder body and the connecting chamber body.

One end of the third valve 24 is communicated with the blocking removal fluid outlet chamber 30 at the back of the multi-channel distribution seat, and the other end of the third valve is communicated with the gathering main pipe through the pipe 23.

In the process of use, the formation produced fluid pipelines of multiple oil wells to be measured are connected on various elbows. According to need, the motor drives the rotary chamber body 19 to rotate, the connecting chamber body 16 is communicated with the fluid inlet channel 29 corresponding to an oil well to be measured. The produced fluid of this oil well firstly enters the shells through the elbows, and after being filtered by the filtering holes on the elbows, enters the check and stop dual-purpose angle valve, enters the fluid inlet channel, the connecting chamber body, the metering outlet and the metering outlet pipe from the outlet pipe 10 on the check and stop dual-purpose angle valve. The produced fluid is loaded into the metering device, and the metering device measures the well yield in unit time. The produced fluids of the other oil wells which have not been metered enter the front chamber 41 of case body 28 through the outlet pipes on the other check and stop dual-purpose valves, and flow out from the gathering main pipe 22 through the second valve. The first valve is closed at ordinary times and can only be opened when removal of blocking is needed.

The incoming fluids enter the shells. After being filtered by the filtering holes, the incoming fluids enter the check and stop dual-purpose angle valves. When blocking removal is needed, the operator should close the check and stop dual-purpose angle valves and open the first valve 14, so that the incoming fluids carrying blockages (such as foreign particles) will enter the blocking removal fluid outlet chamber 30 and enter the gathering main pipe through the third valve and the pipe 23, so that blocking removal is realized. If the check and stop dual-purpose angle valves are opened and the first valve 14 is closed in a period of time after blocking removal, such kind of filters will enter the filtering operation state again.

If the valve stem is rotated, the inner end of valve stem will firmly lean against the inner wall of valve element, the spring is out of function, and such valve is in cut-off state. If the valve stem is rotated in the reversed direction, the valve stem moves outwards until the valve element is completely disengaged from the valve base and the spring is out of action, and such valve is in complete open state. When the valve stem is positioned between said positions, in particular when the valve stem is positioned at half of the movable distance of the valve stem, the valve element leans against the valve base under the action of the spring; when the pressure of the incoming fluids in the inlet pipe is greater than the elastic force of the spring, the valve element is removed and disengaged from the valve base; when the pressure of the incoming fluids in the inlet pipe is less than the elastic force of the spring, the valve element is supported on the valve base, and such valve is in a single flow state.

When the oil well to be measured is provided with a check valve or filtering device, the check and stop dual-purpose valve and the first valve can be integrated into a triple valve, which can substitute the action of the check and stop dual-purpose valve and the first valve.

The quantity of the fluid inlet channels on the multi-channel distribution seat can be 2~15. A well-selection valve can be applicable to 15 oil wells at most. The whole metering and well selection valve group can be placed as shown in FIG. 1 and can also be placed after being rotated by 90° degree in the clockwise direction.

What is claimed is:

1. A metering and well selection valve group, comprising:

multiple shells each having a fluid outlet;

multiple check and stop dual purpose angle valves, each corresponding to a respective one of the shells; and a rotary type metering distributor, wherein:

each shell includes an elbow that has a first part inside the shell, a second part that extends from one side of the shell, and a third part that extends from another side of the shell, the first part of the elbow inside the shell being provided with filtering holes;

the rotary type metering distributor includes a case body having inlets, a first valve, and a blocking removal fluid outlet chamber;

each check and stop dual purpose angle valve includes a valve casing, an inlet pipe provided at one end of the valve casing, and a valve stem mounted at another end of the valve casing, the valve stem having an outer end outside the valve casing and an inner end inside the valve casing;

one side of the valve casing communicates with an outlet pipe, a valve base is provided in the valve casing, a valve element is provided on an inside of the valve base, and the valve element is mounted in together with a cover body;

a handwheel is mounted on the outer end of the valve stem, the inner end of the valve stem passes through the cover body and is fixed on a spring stop;

a first spring is mounted between the spring stop and the valve element;

the outlet pipe communicates with the inlets of the case body, and the third part of the elbow communicates with the blocking removal fluid outlet chamber of the case body via the first valve of the case body.

2. The metering and well selection valve group of claim 1, wherein:

on the rotary metering distributor, a motor is mounted on an outside of the case body, the motor including a motor shaft and a rotary chamber body on the motor shaft, the motor shaft and the rotary chamber body being enclosed within the case body, the case body enclosing a connecting chamber body, a communicating pipe, a metering outlet pipe, a multi-channel distribution seat, a metering outlet on the multi-channel distribution seat, and a fluid inlet channel, an inner chamber of the rotary chamber body communicates with the connecting chamber body through the communicating pipe and communicates with the metering outlet pipe through the metering outlet, and the case body has a filtered fluid inlet that communicates with an inner chamber of the connecting chamber body through the fluid inlet channel.

3. The metering and well selection valve group of claim 2, further comprising:

a sealing device;

a sealed cylinder body positioned in the connecting chamber body;

a gathering main pipe;

a second valve having two ends;

a third valve having two ends; and a second spring, wherein:

the sealing device is provided at an end of the connecting chamber body that is proximal to the multi-channel distribution seat;

one end of the second valve communicates with a front chamber body of the multi-channel distribution seat, and the other end of the second valve communicates with the gathering main pipe;

one end of the third valve communicates with the blocking removal fluid outlet chamber at a back chamber body of the multi-channel distribution seat, and the other end of the third valve communicates with the gathering main pipe;

the sealed cylinder body is provided on the sealing device;

the second spring is provided between a side wall of the connecting chamber body and an end surface of the sealed cylinder body; and an O-ring is provided between the sealed cylinder body and the connecting chamber body.

* * * * *